US006871615B2

(12) United States Patent
Kraft et al.

(10) Patent No.: US 6,871,615 B2
(45) Date of Patent: Mar. 29, 2005

(54) FREE-REIGN WALKING MACHINE FOR TRAINING ANIMALS ALONG A DEFINED TRAINING COURSE

(75) Inventors: Uwe Kraft, Honhardt (DE); Frank Kraft, Honhardt (DE)

(73) Assignee: Uwe Kraft Reitsportgerate & Metallbau GmbH, Frankenhardt-Honhardt (DE)

( * ) Notice: Subject to any disclaimer, the term of this patent is extended or adjusted under 35 U.S.C. 154(b) by 0 days.

(21) Appl. No.: 10/697,843

(22) Filed: Oct. 30, 2003

(65) Prior Publication Data

US 2004/0083985 A1 May 6, 2004

(30) Foreign Application Priority Data

Oct. 31, 2002 (DE) .......................................... 102 51 638
Jan. 13, 2003 (EP) ............................................. 03000703

(51) Int. Cl.[7] .............................................. A01K 15/02
(52) U.S. Cl. ...................................................... 119/704
(58) Field of Search ................................ 119/702, 703, 119/704, 712, 784, 785

(56) References Cited

U.S. PATENT DOCUMENTS 2,500,805 A  *  3/1950  Costello ...................... 119/704
3,349,751 A     10/1967  Frostad ........................ 119/703
3,965,866 A  *  6/1976  Lorentz et al. .............. 119/704
4,138,966 A  *  2/1979  Hesnault ..................... 119/701
4,619,222 A  * 10/1986  Sundberg et al. ........... 119/422
5,630,380 A  *  5/1997  Karanges .................... 119/704
6,055,939 A  *  5/2000  Stelljes ....................... 119/712
6,213,056 B1 *  4/2001  Bergmann et al. .......... 119/704

FOREIGN PATENT DOCUMENTS

| DE | 2852777      | 6/1979  |
| DE | 19746562     | 10/1999 |
| DE | 19954469 A1  | 11/2000 |
| EP | 1216613      | 6/2002  |
| FR | 2301280      | 9/1976  |

* cited by examiner

Primary Examiner—Teri Pham Luu
Assistant Examiner—T. Nguyen
(74) Attorney, Agent, or Firm—Henneman & Saunders; Larry E. Henneman, Jr.

(57) ABSTRACT

The present invention discloses a Free-Reign Walking Machine for the purpose of training animals along a defined training course, especially for the training of horses and camels. The Free-Reign Walking Machine has a number of Moving-Guide-Components that are moveably arranged along a support structure. The path of movement of the Moving-Guide-Components defines or corresponds to the training course for the animals. The supporting structure has at least one fixed rail, on which at least one traveler is moveably arranged. The Moving-Guide-Components are connected to the at least one traveler.

28 Claims, 7 Drawing Sheets

FREE-REIGN WALKING MACHINE FOR TRAINING ANIMALS ALONG A DEFINED TRAINING COURSE

CROSS-REFERENCES TO RELATED APPLICATIONS

This application claims convention priority from European patent application EP 03 000 703.3 (published as EP 1 356 727 A2) filed on Jan. 13, 2003 and from German patent application DE 102 51 638.3, filed on Oct. 31, 2002.

BACKGROUND OF THE INVENTION

The present invention relates to Free-Reign Walking Machines for training animals along a defined training course, and especially to Free-Reign Walking Machines for the training of horses or camels.

A Free-Reign Walking Machine is a system, where horses or other animals can be moved on a defined training course similar to lunging. Prior art Free-Reign Walking Machines were designed using carousel type technology. This type of Free-Reign Walking Machine had a central drive, which held a number of support arms that were attached in an outward radial fashion and held Moving-Guide-Components (mostly in the form of moving gates). During operation of the system, the moving gates moved along a circular course on which the animals were guided. Typically, the circular course was restricted on both sides by a fence. Thus the animals were enclosed in a rotating "cage" or "cage section". An example of such a Free-Reign Walking Machine is disclosed by DE 28 52 777 A1.

The carousel structure becomes relatively sluggish with increasing sizes of the system due to the heavy load of Moving-Guide-Components being further away from the central drive. Even with a powerful electric motor the acceleration and deceleration performance of the Moving-Guide-Components is low in comparison to smaller machines. Due to the heavy construction of such a machine, the bearings and couplings are subjected to a heavy load, which leads to high wear and tear as well as high maintenance effort.

In order to overcome these disadvantages, above-mentioned DE 197 46 562 C1 discloses a Free-Reign Walking Machine, wherein the Moving-Guide-Components, for example 5, are all hung from a common circular ring. This ring is supported by support or guide wheels and is set in rotation when the machine is in use. The latter is achieved by a drive wheel that engages the circular ring and that is connected to a drive. With this type of structure the load is not concentrated in one central area and the system can run easier and be more dynamic.

In the EP 1 216 613 A1 other designs and details of a Free-Reign Walking Machine as previously mentioned are described. The dynamics and quietness of the system is said to be improved through the special support of the circular ring disclosed there.

SUMMARY OF THE INVENTION

It is an object of the present invention to provide an alternative construction for a Free-Reign Walking Machine, which allows a quiet and dynamic operation with low wear and tear and, accordingly, low maintenance as well.

It is another object to provide a quiet and dynamic training machine for horses that can be implemented cost efficiently.

It is another object of the invention to provide an arrangement for automatically training animals which allows for a more varied or more flexible training of animals.

Yet another object is to provide an arrangement for automatically training animals which allows an improved exploitation of space in practice halls and other training areas.

According to one aspect of the invention, these and other objects are achieved by nn arrangement for training animals along a defined training course, comprising a supporting structure having at least one fixed rail and comprising a number of Moving-Guide-Components arranged on the supporting structure and being moveable along a path of movement, wherein the path of movement defines the training course, and further comprising at least one traveler moveably arranged on the rail, wherein the Moving-Guide-Components are connected to the at least one traveler.

According to another aspect, a Free-Reign Walking Machine is provided, the machine comprising a supporting structure having at least one fixed rail, the rail being arranged along the training course, at least one traveler moveably arranged on said rail, a drive system, and a number of Moving-Guide-Components adapted to guide the animals when moving, said Moving-Guide-Components being connected to the at least one traveler, wherein the drive system is adapted to move the traveler and the Moving-Guide-Components along the rail.

According to yet another aspect, a Free-Reign Walking Machine is provided, the machine comprising at least one Moving-Guide-Component for guiding a horse along the defined training course, a supporting structure adapted to carry the Moving-Guide-Component, and a drive system for automatically moving the Moving-Guide-Component along a predefined path of movement which substantially corresponds to the training course, wherein the path of movement is a circulating course having at least one straightaway section.

Different to the currently known structures of this art, the Moving-Guide-Components are moved here by means of a traveler, which runs along a fixed rail. In contrast to the currently known structures it is now possible to construct training and walking courses that are no longer circular in form. In particular, courses can now be realized for the first time that contain straightaway sections, as is explained in detail in the following preferred embodiments.

Additionally, a very quiet running and yet dynamic behavior of the Moving-Guide-Components can be realized by the design proposed here. The fixed rail enables the use of comparatively small and thus lightweight travelers, so that the moving mass/weight of the system is reduced in comparison to the carousel technique and also in comparison to the rotating ring technique. Due to the reduced moving weight, high dynamics (fast acceleration and deceleration) can be reached with a comparatively small motor. Moreover, the load on the drive shaft, the bearings and other parts of the drive mechanism is reduced due to the reduced weight, which in return makes operation possible with less wear and tear as well as less maintenance.

In a preferred refinement of the invention, a number of travelers is arranged on the rail, which number corresponds at least to the number of Moving-Guide-Components, wherein each Moving-Guide-Component is connected to at least one traveler associated therewith.

According to this refinement, each Moving-Guide-Component is moved along the rail by one or more travelers of its own. Alternately, it would also be possible to connect more than one Moving-Guide-Component to one traveler. The preferred refinement, however, provides the advantage that the moving weights are more evenly spaced along the fixed rail, which leads to even better dynamics and less wear and tear. Moreover, it is also easier to remove and add Moving-Guide-Components to the whole system in this refinement, and thus the entire system is very flexible and can be adjusted to meet various needs.

In a further refinement, the supporting structure comprises two rails in parallel, on each of which at least one traveler part is moveably arranged, wherein the at least two traveler parts are connected to each other by a coupling element to form a rail bridging traveler.

Due to these measures, an especially even weight distribution and quiet operation is achieved. Alternatively, it would basically likewise be possible to install the traveler on just one rail. With such a design, less installation time and materials are needed and thus the cost of the entire system would be reduced.

In a further refinement of the previously mentioned measure, the coupling element carries the Moving-Guide-Component.

With this measure, the Moving-Guide-Component, which is preferably a moving gate known per se, is held between the two travelers, which makes an especially stable structure and enables a very quiet operation.

In a further refinement, the two rails are spaced apart by a distance, and the coupling element is adapted to compensate for variations in the distance. In a preferred embodiment, the coupling element comprises two parts moveably attached to each other such that the two parts can move relative to each other in a longitudinal direction.

This refinement makes the behavior of the new machine even more smooth and quiet, and it reduces wear and tear even further.

In a further refinement, the at least one traveler is connected to a pulling element and there is a drive capable of moving the pulling element.

Basically, it would be possible to have a separate drive for each traveler with the structure proposed here. Such an arrangement with "distributed drives" allows for additional flexibility and independent control of the Moving-Guide-Components. Such flexibility has not (as yet) been needed, and due to costs and system control complexity it is preferable to use one drive to move many travelers at the same time. This can be achieved in a cost effective manner, if the travelers are connected to one drive by a pulling element. The pulling element can in principle be of any type, such as a chain, a belt, rope or similar product. Depending on the shape of the track, rigid elements can at least be used in sections as explained according the preferred design below.

The use of a pulling element as described here is a cost effective possibility for controlling many Moving-Guide-Components with just one drive on a Free-Reign Walking Machine. The single drive can basically be mounted to one traveler, or it can be mounted to a fixed location, which is preferred here. The latter has the advantage that the electric lines can be fixed to one stationary drive and do not need additional wiring to compensate for movement. The complexity of installation and thus the costs are hereby reduced.

In a further preferred refinement, the pulling element is a chain or chainlike element having a plurality of rigid chain links, preferably hollow-profile chain links, which are pivotally connected to each other.

This measure is advantageous in that it also transfers pushing power via the pulling element, whereby the driving force can be distributed even more evenly to a plurality of travelers. As a result the connected Moving-Guide-Components can be moved with less jerking and with more gradual increase in speed and deceleration. The use of hollow-profile chain links further has the advantage that the total moving weight of the system is reduced and this is advantageous to the dynamics and wear and tear of the entire system.

A further refinement of the previously mentioned measure is that the cross-section of the chain links is substantially rectangular.

This measure allows for the especially efficient use of a Pressure-Wheel-Drive in order to drive the chain and the travelers. Due to the rectangular shape of the cross-section the pressure wheel can effectively grasp the individual chain links. At the same time the quietness of operation is increased due to this manner.

A further preferred refinement is that the individual chain links are between about 0.2 Meter to about 5 Meters in length, preferably about 3.5 Meters.

In this refinement, the pulling element is a chain link arrangement having relatively long chain links that are connected pivotally to each other. The longer the chain link sections are, the less flexible joint sections are required, and thus friction and wear and tear are reduced when operating the system. In addition, the efficiency and quietness of operation are improved especially when a Pressure-Wheel-Drive is used. The preferred length of 3.5 Meters has the advantage that one Moving-Guide-Component can be connected and moved by each chain link. The resulting even distribution of weight also adds to the quietness and dynamics of the machine. However, it should be appreciated that the sizes mentioned above are not set in stone and can be adjusted to best fit the entire system.

In a further refinement, the chain links are connected together with a limited longitudinal play in pulling direction. In transverse direction, the connection preferably has no play. Even more preferred is it when a resilient member is arranged at the end of at least one chain link for reducing contact noises between chain links.

This refinement provides a good strength distribution in the pulling direction and also contributes to jerk free and dynamic motion. Through the flexibility in the longitudinal direction the otherwise rigid chain links can run especially quiet and problem free in curved sections of the track as well. The play is even more advantageous the longer each individual chain link is and the tighter the radius of a curved track is.

In a further refinement, the chain is connected to a plurality of travelers in the area of its joint sections, preferably with a traveler being connected at each joint section.

This measure enables a cost effective and easily installed way to increase the stability of the drive system, which again improves the quietness and dynamics of the operation of the system. Since the travelers are attached to the chain in the area of the flexible joint, the "sensitive" joint areas are very well supported against weight stress and other influences.

In a further refinement, which is a preferred and an inventive deviation from the traditional Free-Reign Walking Machines by itself, the path of movement of the Moving-Guide-Components is a circulating course having straight-away sections in at least some parts.

All of the hitherto known Free-Reign Walking Machines have exclusively circular courses and therefore also circular training surfaces for the animals. The space usually available in a training arena is thus not used to its full potential. In addition to this, the animals do not have the possibility to train on straightaway sections with the traditional Free-Reign Walking Machines, which reduces the training possibilities. The presented design enables (for the first time) a more varied training with the help of a Free-Reign Walking Machine, and it especially offers the possibility to optimize the space available in an indoor arena.

It is understood, that the previously named and following described characteristics can be used not only in the mentioned combinations, but also in other combinations or also independently, without leaving the scope of the invention presented here.

BRIEF DESCRIPTION OF THE DRAWINGS

Exemplary embodiments of the invention are represented in the drawings and are explained in the following description, wherein:

FIG. 9 shows yet another embodiment of the new approach in a schematized illustration.

DETAILED DESCRIPTION OF PREFERRED EMBODIMENTS

Figure 1:
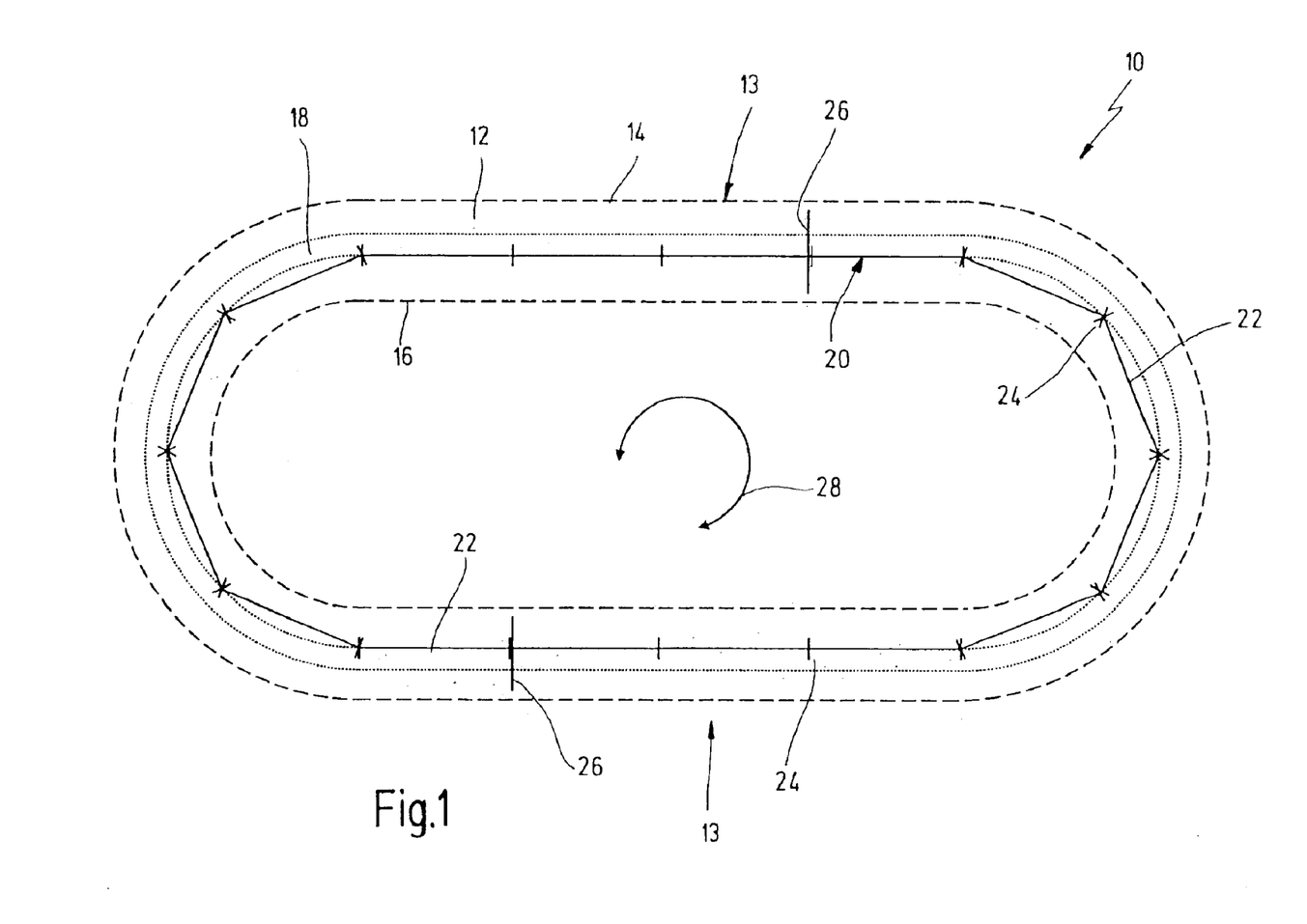
FIG. 1 is a schematic representation of an embodiment of the new Free-Reign Walking Machine as viewed from above.

In FIG. 1, an embodiment of the new Free-Reign Walking Machine is designated by reference number 10 in its entirety.

The Free-Reign Walking Machine 10 has a closed training course 12 which, for the first time and in contrast to traditional installations, has straightaway sections 13. The training course 12 is bordered on the inside radius and outside radius by a fences 14 and 16. The fences 14 and 16 are not necessarily a part of the invention presented here. A fixed rail matched to the training course 12 is designated by reference number 18, and it is in the approximate center of the training course 12. The fixed rail 18 carries a plurality of travelers, to which Moving-Guide-Components for various animals such as horses and camels are moveably attached. The individual travelers (not depicted here) are driven by a chain system 20, which according to a preferred embodiment has sixteen rigid chain links pivotally connected to each other. The length of each individual chain link 22 is approximately 3.5 Meters in htis case.

The flexible joints, where the individual chain links 22 are connected to form the circulating chain 20, are schematically illustrated here by means of small lines 24. As depicted in FIG. 1, the chain 20 runs along the inner side of the radius of the fixed rail 18 and follows the form of the circulating fixed rail 18 (as far as is possible in consideration of the rigid chain links 22).

Reference number 26 depicts an example of two Moving-Guide-Components in the form of moving gates that are connected to the chain 20 in a manner that will be described in detail later. In the preferred embodiment each flexible joint section 24 (of the chain 20) holds a Moving-Guide-Component 26. The Free-Reign Walking Machine 10 can also be operated with a smaller or larger amount of Moving-Guide-Components 26.

With the help of the chain 20, the Moving-Guide-Components 26 are moved in the direction of the arrow 28 along the circulating course. In combination with the two fences 14, 16 on each side, the Moving-Guide-Components 26 form a moving walking area, in which animals such as a horse or a camel can be lead.

Figure 2:
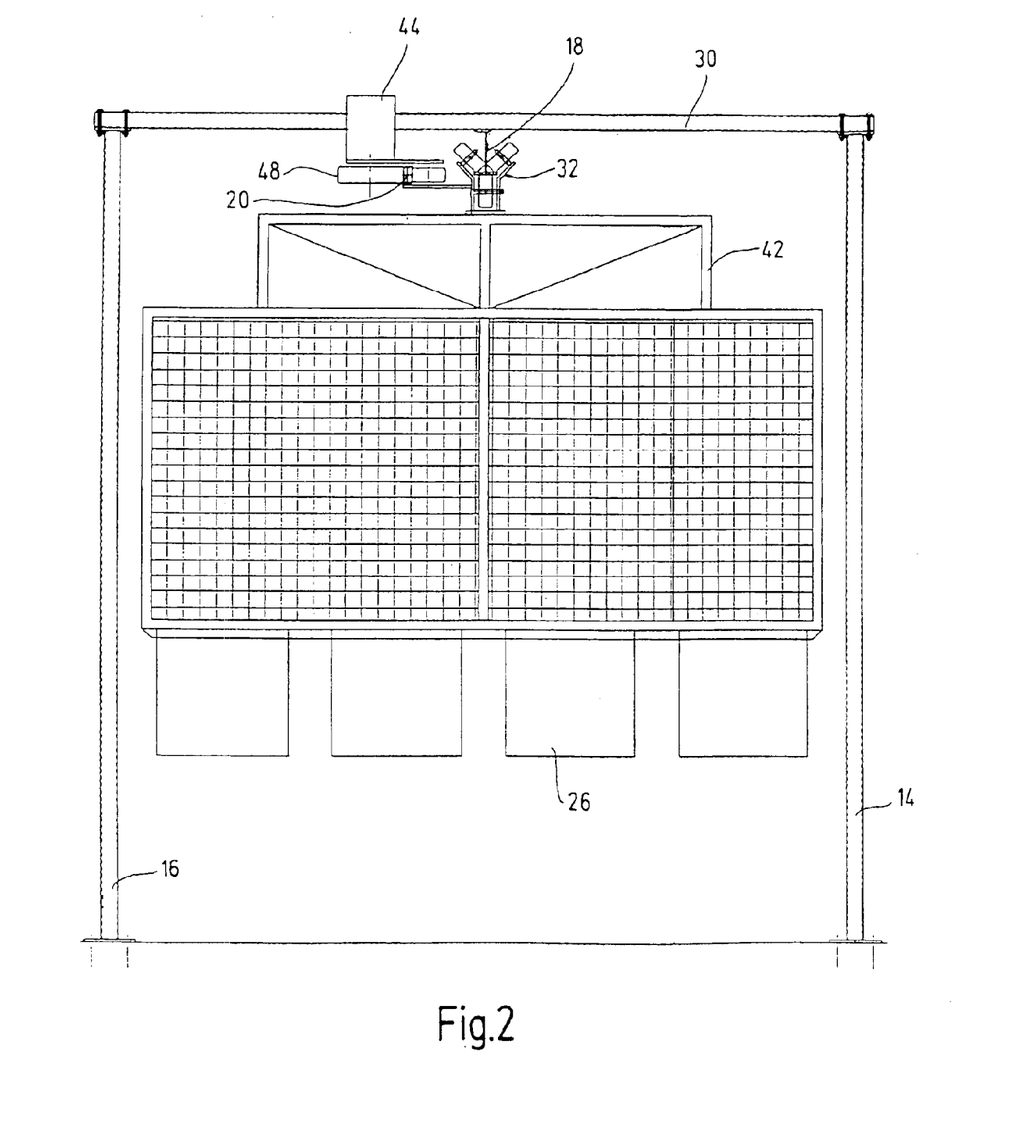
FIG. 2 illustrates the support and drive structure of the Free-Reign Walking Machine from FIG. 1 in a partial schematic representation.
Figure 3:
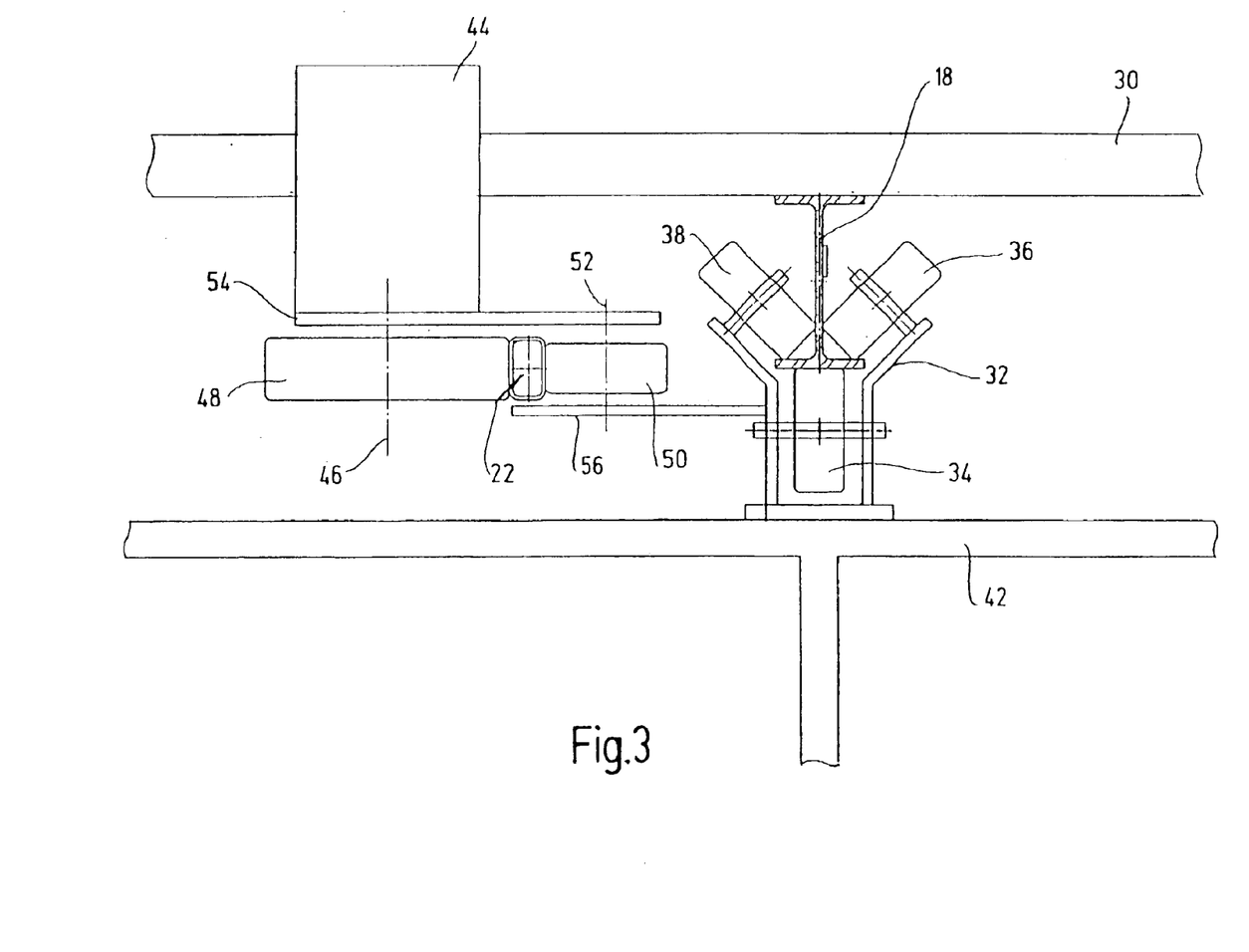
FIG. 3 is an enlarged detail representation of the support and drive structure from FIG. 2.

FIGS. 2 and 3 show the support and drive structure of the Free-Reign Walking Machine 10 with respect to a single Moving-Guide-Component/gate 26. Same reference numbers designate the same elements as before.

The fixed rail 18 of this embodiment is an I-beam in the cross section. The top of the I-beam 18 is mounted (welded for example) to the bottom of a series of horizontal crossbeams 30. Posts 14 and 16, which also function as partial frames for the inner and outer fences, hold the horizontal crossbeams 30. Alternatively to this, the fixed rail could also be mounted to the ceiling of an indoor training arena or the crossbeams 30 could be mounted on some other supported element.

Figure 6:
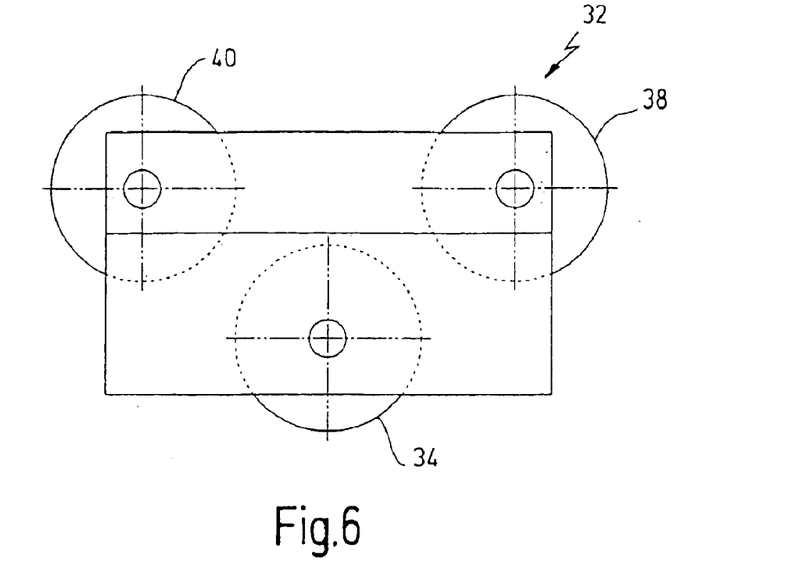
FIG. 6 is a schematic representation of the traveler with the drive structure according to FIG. 2 and 3, FIG. 7 an alternative support and drive structure according to another embodiment of the new Free-Reign Walking Machine.

The traveler 32 described here has a total of five wheels, of which three wheels 34, 36, 38 can be seen on FIG. 3. The three wheels mentioned are arranged in a Y-shape and grip the bottom section of the I-beam rail 18 in a star-like form. Wheel 34 functions as a pressure wheel, while wheels 36 and 38 actually carry the weight. Two other wheels of the same design are behind wheels 36 and 38, which are depicted in FIG. 3. These wheels are shown in the schematic side view of the traveler (FIG. 6). One of the two wheels not shown in FIG. 2 and FIG. 3 can be seen in FIG. 6 with the reference number 40.

The Moving-Guide-Component/gate 26 is attached to the bottom of the traveler 32 with the aid of a frame 42. This can be accomplished by welding, bolting or by some other sufficiently stable connection. The Moving-Guide-Component/gate 26 is thus mounted to the traveler 32 and hung in a movable position to the fixed rail 18. In other words, the Moving-Guide-Component/gate 26 can (with the help of the traveler 32) move along the fixed rail 18 and consequently along the defined training course 12.

Reference number 44 designates a drive, which is an electric motor in this case. The electric motor 44 gives its power to a pressure wheel 48 over an axis 46 only schematically depicted here. It is in a horizontal position next to the traveler. Reference number 50 depicts the Counter-Pressure-Wheel that is positioned on a second axis and is also positioned a specific distance from the pressure wheel 48. The chain 20 runs between the pressure wheel 48 and the Counter-Pressure-Wheel 50. A cross section of one of the chain links 22 is depicted in FIG. 3.

According to the preferred embodiment, the chain links 22 have a rectangular cross section, so that the pressure wheel 48 and the Counter-Pressure-Wheel 50 can grip the chain links 22 with the largest possible surface contact. A good transfer of the power to the chain 20 is thus achieved.

The motor 44, the pressure wheel 48 and the Counter-Pressure-Wheel 50 are connected to a mounting plate 54 and together form a drive unit. This drive unit can be mounted on a desired position along the track of the chain 20 (see FIG. 1). The chain 20 that runs between the pressure wheel 48 and the Counter-Pressure-Wheel 50 is connected to the Moving-Guide-Component with a connection plate 56. It is preferred that the connection plate 56 be welded to the chain 20 in the vicinity of the joint 24 between two chain links 22 (not depicted in FIG. 3). This is described in more detail in FIG. 4. The chain 22 can, however, also be connected to the traveler 32 in other ways.

Each Moving-Guide-Component 26 is connected with a traveler 32 in the depicted way. With the Free-Reign Walking Machine 10 according to FIG. 1, up to sixteen Moving-Guide-Components 26 are connected to the circulating chain 20. Each joint section 24 thus has one traveler 32. It should be understood, that the Free-Reign Walking Machine 10 can also operate with a lesser number of Moving-Guide-Components 26, whereas it would still be advantageous to have a traveler 32 spaced at each joint section 24 along the chain 20.

Figure 4:
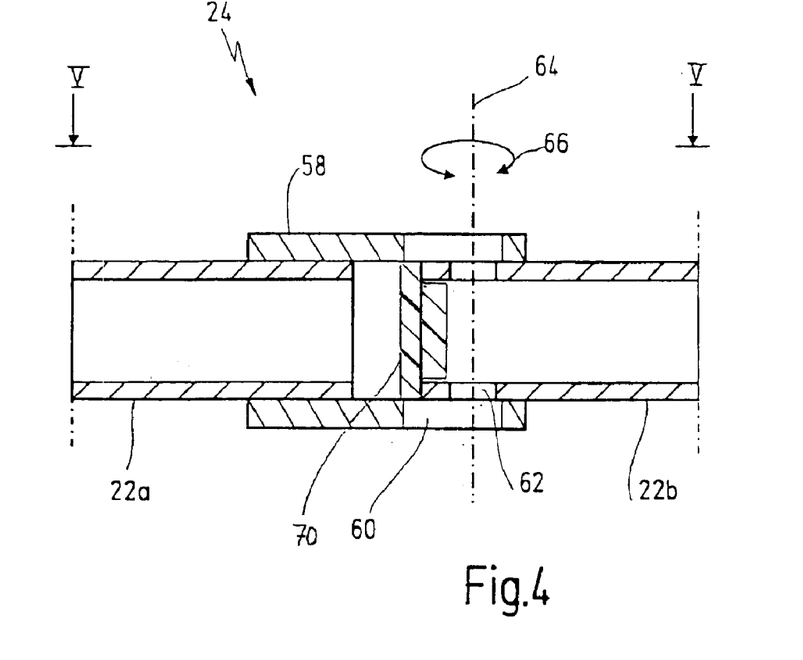
FIG. 4 is a cross section of the flexible joint of the chain link system (pulling element) used in the drive structure from FIG. 3.
Figure 5:
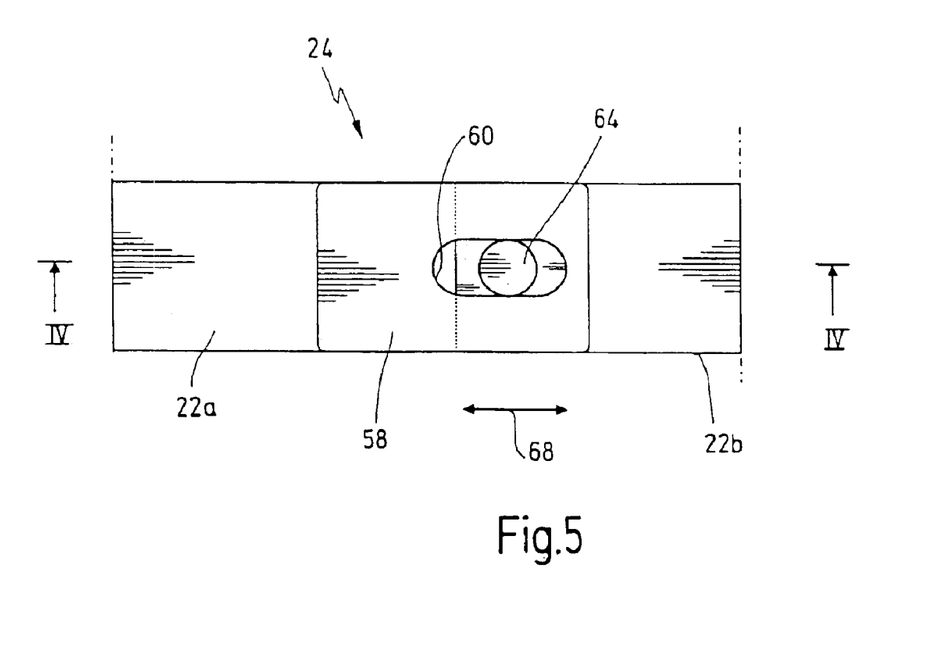
FIG. 5 is the flexible joint section from FIG. 4 as viewed from above.

The preferred connection of chain links 22 in the area of the joint sections 24 can be discerned in the depictions of FIGS. 4 and 5.

The first chain link 22a has two plates 58 welded to opposite sides of one end of the chain link 22a. With this U-shaped "mouth piece" 58 the chain link 22a clamps the end of the next chain link 22b on the right as depicted in FIGS. 4 and 5. The "mouth piece" 58 and the end of the chain link 22b have aligning holes 60 and 62 through which a bolt 64 is inserted in order to connect chain links 22a and 22b. The chain link 22b can thus move in the direction of the arrow 66 and in the opposite direction of chain link 22a. Flexible joints hereby connect both chain links 22a and 22b.

In order to have enough play in the rotating direction 66, the "mouth piece" 58 is designed long enough so that both ends of the opposite chain links 22a and 22b have a sufficient gap. In addition to this, the holes 60 in the "mouth piece" 58 have an elongated shape in the pull direction of the chain as depicted in FIG. 5. Because of this, the chain link 22b can move in the direction of the arrow 68 (that is, with some longitudinal play against chain link 22a). Furthermore, a resilient plug 70 is introduced here into the open end of chain link 22b. Resilient plug 70 can be made from rubber, PVC or the like, and it helps to reduce noises which could otherwise be caused by contact of the metal chain links 22a and 22b. Due to this preferred design, an especially jerk free and quiet operation is achieved even in curved areas of the rail of the chain 20.

According to a preferred embodiment the connection plate 56 (not depicted here) is welded to the bottom of the "mouth piece" 58, whereby the chain link 22a receives a rigid connection to the traveler 32. The chain link 22b has the same type of connection on its opposite end to which another traveler 32 is rigidly connected. In this way, the chain 20 is supported by travelers 32 at each joint section 24, which results in a stable and quiet operation.

The drive of the travelers 32 described here with the chain 20 has proven itself to be extremely effective in practice, also in order to achieve a quiet and dynamic drive of the Moving-Guide-Components 26. This kind of chain 20 thus represents an especially preferred design. Alternatively, a conventional chain can also drive the travelers 32, such as with a geared drive and a gear belt or some other appropriate drive mechanism. In addition to this, the chain link sections 22 can be made longer or shorter in contrast to the preferred design represented here. Shorter chain links 22 are especially advantageous if a circular course 12 with a smaller radius is to be constructed.

It should also be understood that the number and shape of travelers 32 can be varied over to the design depicted heretofore. An especially preferred variant is presented in FIGS. 7 and 8. The same reference numbers describe the same components as before.

Figure 7:
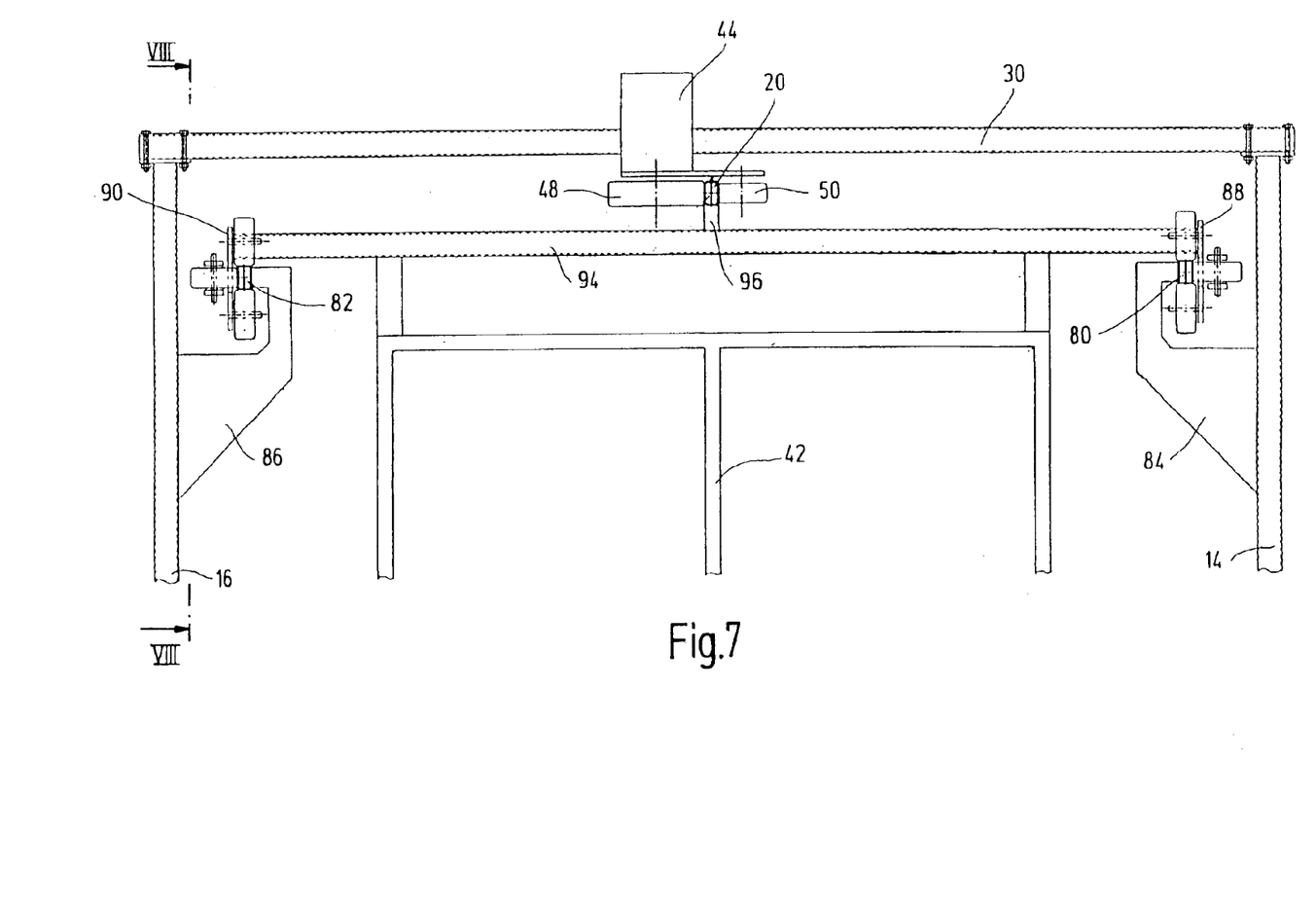

The design according to FIG. 7 contains a Free-Reign Walking Machine with two parallel rails 80, 82, that are each supported by the upper free end of support elements 84, 86. The support elements 84, 86 are each connected to the posts of the side fences 14, 16. The rails 80, 82 pictured in this design have a rectangular cross section. They can also be alternatively designed with other cross sections.

Figure 8:
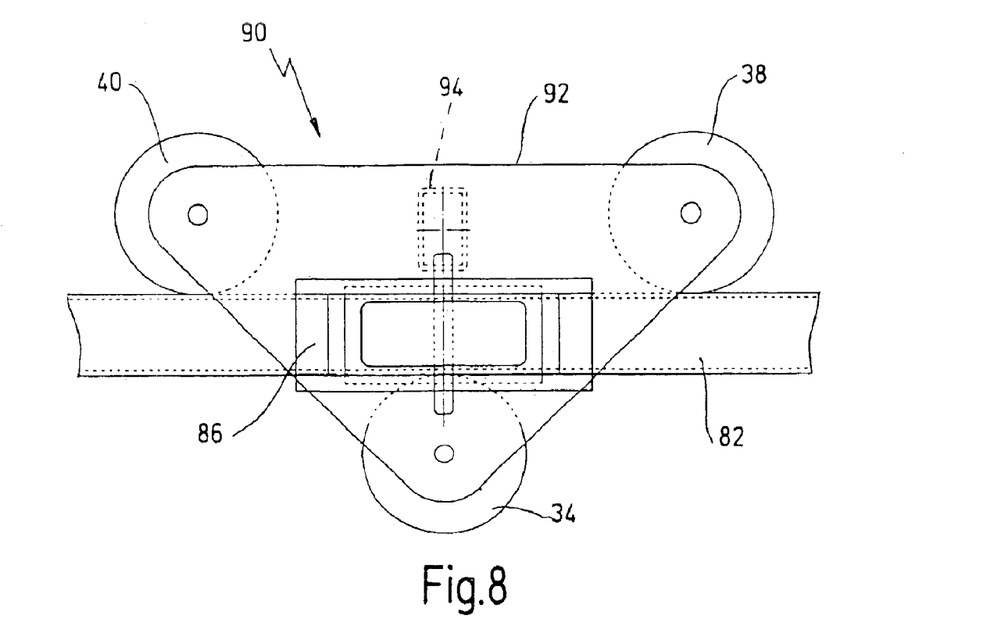
FIG. 8 shows a traveler for the drive structure in FIG. 7 as viewed from the side.

A traveler part 88, 90 is moveably connected to each of the rails 80, 82. The side view of the traveler part 90 is depicted in FIG. 8. As can be seen there, each traveler part 88, 90 has three guide wheels 34, 38, 40, that are connected to each other with a frame 92. The guide wheel 34 works as a Counter-Pressure-Wheel, whereas the guide wheels 38, 40 carry the load of the Moving-Guide-Components 26.

A crossbar 94 connects the two traveler parts 88, 90. A frame 42 connects the Moving-Guide-Component 26 to the crossbar 94. The chain 20 is designed as in the preferred embodiment described earlier and is welded to a flange 96 of the crossbar 94 (preferably in the center above the cross bar 94). The chain 20 is driven with an electric motor 44 over a pressure wheel 48 and a Counter-Pressure-Wheel in the same manner as previously described. An especially stable and quiet operation is achieved due to the traveler parts 88, 90 being mounted on both sides of the Moving-Guide-Component/gate.

Yet another preferred embodiment is depicted in FIG. 9. Same reference numerals again designate same elements.

The embodiment of FIG. 9 distinguishes over the embodiment from FIG. 7 by the crossbar 94 being adapted to compensate for variations in the mutual distance between rails 80, 82. For this purpose, crossbar 94 comprises a first part 100 and a second part 102, wherein the second part 102 is adapted to slidingly accommodate the end of first part 100. Thus, first part 100 and second part 102 are adapted to move relative to each other in a longitudinal direction, which is depicted here by arrow 104. A hook 106 is attached to the first part 100, and a tensioning spring 108 is attached to hook 106 with one end. The other end of tensioning spring 108 is fixed to second crossbar part 102 or traveler part 88 connected to crossbar part 102. Tensioning spring 108 allows the two crossbar parts 100, 102 to move relative to each other for compensating distance variations between rails 80, 82, while it keeps the two parts 100, 102 is a defined relative position at the same time.

According to another aspect, the machine of FIG. 9 comprises a drive unit having the two wheels 48, 50 as described before. In contrast to the previous embodiments, however, both drive wheels 48, 50 are driven here by motor 44, which provides more driving force and an even more smooth and dynamic behavior. For this purpose, the drive unit comprises at least one further wheel 110 adapted to rotate Counter-Pressure-Wheel 50 in a direction opposite to the rotation of pressure wheel 48. In a preferred implementation, the opposite rotational directions of wheels 48, 50 are derived from a single drive shaft of motor 44 by a belt coupling system (not shown here in detail for sake of simplicity).

What is claimed is:

1. A Free-Reign Walking Machine for the training of animals along a defined training course, the machine comprising:

a supporting structure having at least one fixed rail, the rail being arranged along the training course, at least one traveler moveably arranged on said rail, a drive system having a pulling element and a drive capable of moving the pulling element, and a number of Moving-Guide-Components adapted to guide the animals when moving, said Moving-Guide-Components being connected to the at least one traveler, and wherein the at least one traveler is connected to the pulling element, the pulling element is a chainlike element having a plurality of rigid chain links pivotally connected to each other with a limited longitudinal play in a pulling direction, and the drive system is adapted to move the traveler and the Moving-Guide-Components along the rail.

2. The Free-Reign Walking Machine of claim 1, comprising a number of travelers arranged on the rail, wherein each Moving-Guide-Component is connected to at least one traveler associated therewith.

3. The Free-Reign Walking Machine of claim 1, wherein the supporting structure comprises two rails in parallel, and wherein the traveler comprises at least two traveler parts and a coupling element to form a traveler bridging the two rails.

4. The Free-Reign Walking Machine of claim 3, wherein the two rails are spaced apart by a distance, and wherein the coupling element is adapted to compensate for variations in the distance.

5. The Free-Reign Walking Machine of claim 3, wherein the coupling element carries the Moving-Guide-Component.

6. The Free-Reign Walking Machine of claim 1, wherein the drive is arranged in a fixed position.

7. The Free-Reign Walking Machine of claim 1, wherein the chain links are hollow-profile chain links.

8. The Free-Reign Walking Machine of claim 1, wherein the chain links have a substantially rectangular cross section.

9. The Free-Reign Walking Machine of claim 1, wherein the individual chain links are between about 0.2 Meters and about 5 Meters in length.

10. The Free-Reign Walking Machine of claim 9, wherein each individual chain link is approximately 3.5 Meters in length.

11. The Free-Reign Walking Machine of claim 1, wherein the chain links each have an end facing to another chain link, and wherein a resilient member is arranged at the end for reducing contact noises between chain links.

12. The Free-Reign Walking Machine of claim 1, wherein the chainlike element comprises a plurality of joint sections, and wherein the travelers are connected to the chainlike element in the area of the joint sections.

13. The Free-Reign Walking Machine of claim 12, wherein at least one traveler is connected at each joint section.

14. The Free-Reign Walking Machine of claim 1, wherein the training course is a circulating course having at least some straightaway sections.

15. A Free-Reign Walking Machine for automatically guiding horses along a defined training course, the machine comprising:

at least one Moving-Guide-Component for guiding a horse along the defined training course, a supporting structure adapted to carry the Moving-Guide-Component, and a drive system having a pulling element an a drive capable of moving the pulling element, the drive system for automatically moving the Moving-Guide-Component along a predefined path of movement which substantially corresponds to the training course, and wherein the pulling element is a chainlike element having a plurality of rigid chain links pivotally connected to one another with a limited longitudinal play in a pulling direction, and the path of movement is a circulating course having at least one straightaway section.

16. An arrangement for training animals along a defined training course, comprising a supporting structure having at least one fixed rail and comprising a number of Moving-Guide-Components arranged on the supporting structure and being moveable along a path of movement, wherein the path of movement defines the training course, and further comprising at least one traveler moveably arranged on the rail, wherein the Moving-Guide-Components are connected to the at least one traveler, and further comprising a chainlike pulling element and a drive unit capable of moving the pulling element, wherein the at least one traveler is connected to the pulling element and the pulling element has a plurality of rigid chain links pivotally connected to each other with a limited longitudinal play in a pulling direction.

17. The arrangement of claim 16, wherein a number of travelers are arranged on the rail, which number corresponds at least to the number of Moving-Guide-Components, and wherein each Moving-Guide-Component is connected to at least one traveler.

18. The arrangement of claim 16, wherein the supporting structure comprises a first and a second rail in parallel with each other, and wherein the traveler comprises at least a first and a second traveler part, with the first traveler part being moveably arranged on the first rail and the second traveler part being moveably arranged on the second rail.

19. The arrangement of claim 18, further comprising a coupling element for connecting the first and second traveler parts.

20. The arrangement of claim 19, wherein the coupling element carries the Moving-Guide-Component.

21. The arrangement of claim 16, wherein the drive is arranged in a fixed position at the supporting structure.

22. The arrangement of claim 16, wherein the chain links are hollow-profile chain links having a substantially rectangular cross-section.

23. The arrangement of claim 16, wherein the individual chain links are between approximately 0.2 Meters and approximately 5 Meters in length.

24. The arrangement of claim 23, wherein the individual chain links are approximately 3.5 Meters in length.

25. The arrangement of claim 16, wherein the drive unit comprises a motor and at least two drive wheels engaging the pulling element, wherein the motor is configured to drive the at least two drive wheels in opposite rotational directions.

26. The arrangement of claim 16, wherein:

the chain links each have an end facing to another chain link, and a resilient member is arranged at the end for reducing contact noises between chain links.

27. A Free-Reign Walking Machine for the training of animals along a defined training course, the machine comprising:

a supporting structure having at least two fixed rails in parallel, the rails being arranged along the training course, at least one traveler moveably arranged on the rails, the traveler having two traveler parts and a coupling element to form a traveler bridging the two rails, a drive system, and a number of Moving-Guide-Components adapted to guide the animals when moving, said Moving-Guide-Components being connected to the at least one traveler, and wherein the two rails are spaced apart by a distance, the coupling element is adapted to compensate for variations in the distance, and the drive system is adapted to move the traveler and the Moving-Guide-Components along the rails.

28. An arrangement for training animals along a defined training course, comprising:

a supporting structure having a first and a second rail in parallel with each other, a number of Moving-Guide-Components arranged on the supporting structure and being moveable along a path of movement defining the training course, at least one traveler moveably arranged on the rails, the traveler having at least a first and a second traveler part, the first traveler part being moveably arranged on the first rail and the second traveler part being moveably arranged on the second rail, a coupling element connecting the first and second traveler parts, and wherein the Moving-Guide-Components are connected to the at least one traveler, the first and second rails are spaced apart by a distance, and the coupling element is adapted to compensate for variations in the distance between the first and second rails.

* * * * *